Oct. 9, 1945.  A. KÉGRESSE  2,386,217
AUTOMATIC VARIABLE SPEED TRANSMISSION
Filed July 10, 1940  6 Sheets-Sheet 1

Inventor
ADOLPHE KÉGRESSE

By *AMHolcombe*
Attorney.

Oct. 9, 1945. A. KÉGRESSE 2,386,217
AUTOMATIC VARIABLE SPEED TRANSMISSION
Filed July 10, 1940 6 Sheets-Sheet 2

Inventor
ADOLPHE KÉGRESSE
By [signature]
Attorney.

Oct. 9, 1945.　　　　A. KÉGRESSE　　　　2,386,217

AUTOMATIC VARIABLE SPEED TRANSMISSION

Filed July 10, 1940　　　6 Sheets-Sheet 3

Inventor
ADOLPHE KÉGRESSE

By *Attorney*

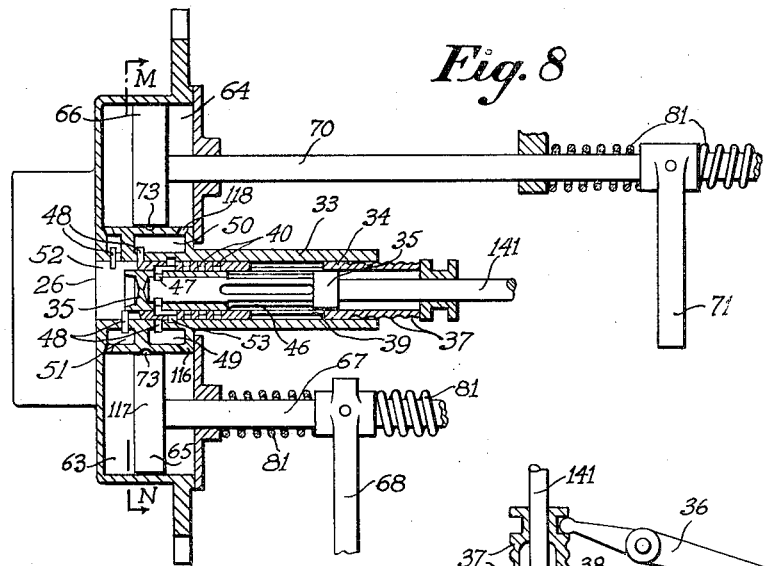
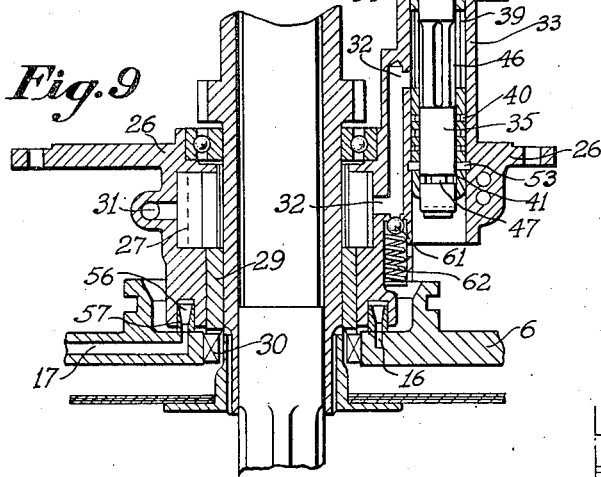
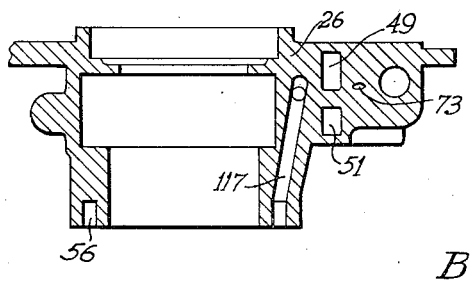
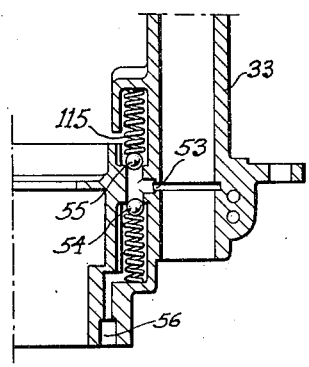

Oct. 9, 1945.  A. KÉGRESSE  2,386,217
AUTOMATIC VARIABLE SPEED TRANSMISSION
Filed July 10, 1940   6 Sheets-Sheet 5

Inventor
ADOLPHE KÉGRESSE
By *A. M. Holcombe*
Attorney.

Oct. 9, 1945.  A. KÉGRESSE  2,386,217
AUTOMATIC VARIABLE SPEED TRANSMISSION
Filed July 10, 1940  6 Sheets-Sheet 6
*Fig. 17*
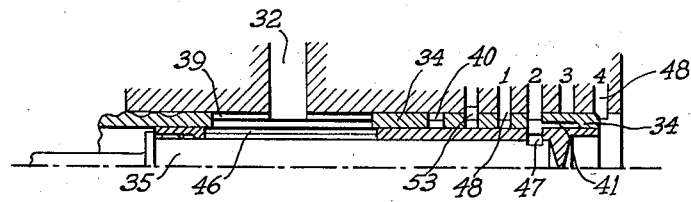
*Fig. 18*  *Fig. 19*
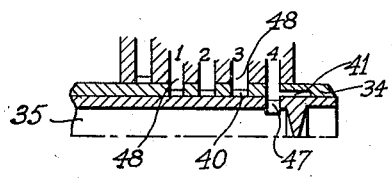 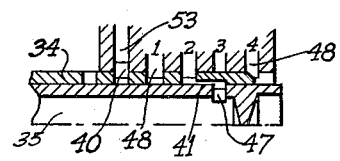
*Fig. 20*  *Fig. 21*
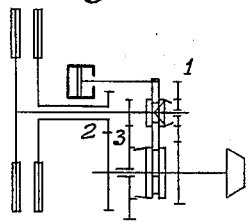 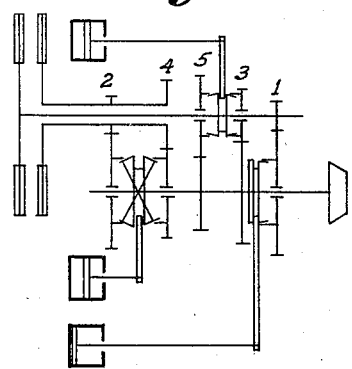
*Inventor*
ADOLPHE KÉGRESSE
By *[signature]*
*Attorney.*

Patented Oct. 9, 1945

2,386,217

UNITED STATES PATENT OFFICE 2,386,217

AUTOMATIC VARIABLE SPEED TRANSMISSION

Adolphe Kégresse, Paris, France; vested in the Alien Property Custodian

Application July 10, 1940, Serial No. 344,826
In France July 28, 1939

10 Claims. (Cl. 74—330)

This invention relates to an automatic variable speed transmission the operation of which can be varied by hand.

This mechanism is characterised by great facility of manufacture and an appreciable reduction in the cost price, and also by its small bulk as compared with similar transmissions. It is applicable to all machines using change speed gears and more particularly to automobile vehicles of all kinds, to the motor-cycle, to motor rail vehicles, tractors, and the like.

The known and practically used gears, termed "automatic change-speed gears" or "semi-automatic change speed gears" are all special devices of a greater weight and bulk than the usual change speed gears. They are more difficult to make and necessitate a considerable number of new machine tools. Furthermore, most of them are not complete, that is to say, that their operation is not absolutely automatic and requires, for example, a de-clutching controlled by pedal for the starting and stopping or the manipulation of a knob or handle to operate them.

The apparatus forming the subject of the invention is of the type with two clutches mounted on concentric shafts and controlling constant-mesh gears. These latter are driven by the shafts by means of dog clutches of the "synchromesh" type or the like.

It comprises essentially four groups of distinct members, each of them forming a system which, united to the others, again gives a compact whole. These groups are:

1. A block of two multi-disc clutches, compressed hydro-mechanically, the fluid used being preferably lubricating oil.
2. A hydraulic system comprising: a pump, cylinders and pistons controlling the clutches, a distributor of fluid to the clutches, a double automatic and hand selector and also valves and distribution and discharge slide valves.
3. The change-speed gear proper, which contains the clutches and their coupling devices.
4. The automatic running regulator with the controls.

The apparatus replaces with advantage, for example on an automobile, the clutch and the change-speed gear as at present and permits of definitely eliminating the clutch pedal and the change-speed lever.

The vehicle, apart from the steering, is then controlled with a single foot which acts either on the accelerator to increase or maintain the speed, or on the brake to obtain a slowing down or the stopping of the vehicle.

All the operations: starting of the vehicle, change of speed, and stopping, always take place automatically without the possibility of stalling the engine. In descending hills, the use of the engine as a brake is obtained in all the speeds.

The invention furthermore presents the great advantage when it is applied to existing automobiles of being able to utilise a certain percentage of the existing parts. Thus, for example, the clutch casing and change-speed gear wheels, bearings of the latter and a part of the shafts and clutches of the change-speed gear can generally be used. The advantage of being able to use existing parts gives a supplementary guarantee of good operation, since these parts already proved on current models will be free from the risks always to be feared in the case of newly designed mechanisms. In any case, the invention permits of the use almost entirely of existing machine tools.

Each of the above-mentioned groups of members presents more particularly the following characteristics:

1. A single block, centred on the principal axis and integral with the casing, contains the whole of the hydraulic portion. This block will be hereinafter termed the "hydraulic body." It permits of doing away entirely with tubing under pressure, thus avoiding, together with the risks of leakages at the joints and breakages always to be feared, the lengths of piping prejudicial to rapid operation. It furthermore permits of considerably reducing the difficulties of assemblage.

2. The feed of the annular clutch-operating piston, which may be replaced by a simple diaphragm, takes place at the moment of starting, by "transit," that is to say, that the engine running slowly, the fluid traverses diametrically the cylinder of the annular clutch-operating piston, to escape outwards through a centrifugal valve arranged to this end opposite the delivery valve. This permits with the least movement of the accelerator, of obtaining complete engagement since, when running on no load, all the "dead" spaces are filled with oil which is flowing. This point is most important since, without instantaneous starting, no transmission of any kind can be practical.

3. The feed of fluid to the clutch block has been effected by an "extensible" distributor mounted on the hydraulic body and being applied against the clutch block under the effect of a portion of the pressure of the fluid, which pressure acting equally on the extensible walls of the distributor itself, radically does away with any risk of leakage without nevertheless preventing the distributor from following the small axial displacement due to play and to expansions. This distributor, taking up less space than those hitherto used, does not suffer like them under the influence of wear.

4. The arrangement of the single pump, located in the hydraulic body, itself extremely simplified, its drive by the engine, effected by means of a toothed sleeve. Furthermore, its body being integral with the same part as the other hydraulic members, the distance to be travelled by the fluid is much reduced, which ensures a rapidity of operation which has not existed in the case of similar devices, the slow action of which is well known.

5. The speed selector, an essential member of the apparatus presents a novel and simplified solution of the selection of speeds. It comprises two concentric slide valves of equalised pressure. One of these, the centre one, is controlled by the regulator mounted on the driven shaft; it assures the automatic operation. The outer slide valve is controlled by hand and permits, if the driver desires, of retaining a selected speed, the lower speeds remaining always subject to the action of the regulator, when the speed of the engine is no longer sufficient to support the selected speed. The spring and the resistance of the regulator are arranged for given speeds which correspond to the characteristics of the engine. In principle, these characteristics are selected to correspond to the lowest practically utilisable speed of the engine, for each gear ratio. A supplementary locking preferably controlled by the accelerator pedal in the second half of its stroke, presents the possibility, with an insignificant effort, in spite of the high thrusts due to centrifugal forces, of considerably retarding the action of the regulator, thus permitting of prolonging the period of running in each speed, without supplementary manipulation. This feature is especially advantageous in starting, which it makes more powerful, and also on inclines.

6. It is known that in the case of entirely automatic transmissions, it is impossible when stopping on a downward slope to hold back the car by means of the engine. In the same way, the engine cannot be started by the car. This is one of the many defects of these transmissions.

According to the invention, when at rest one of the clutches is compressed by springs, so that it is sufficient, by hand, to engage one of the speeds corresponding to this engagement, in order to obtain the same result as with ordinary automobiles.

7. The cylinders and pistons controlling the dog clutches are grouped on each side of the selector, from which they receive the oil under pressure. They are double acting. One of them controls the uneven speeds of one of the friction clutches; the first by one face, the third by the other face; the other controls the even speeds of the second friction clutch, under the same conditions.

The cylinders and pistons of the dog clutches are also used for the distribution of oil under pressure to the clutches, in such manner that the operation of the latter depends on the displacement of the first.

The friction clutches cannot come into operation until after the dog clutches, so that wrong manipulation is impossible.

8. Practical experience of clutches using a pressure of oil has shown that it is absolutely necessary to prevent this fluid from coming into contact with the rotating block of clutches of large diameter. This contact has for effect, at a high speed, of creating an emulsion of the oil such that it becomes impossible to obtain the free pressure necessary for the proper functioning of the apparatus. Obviously a deep casing or a separate reservoir, may solve the problem. The second solution necessitates piping, a special pump and a reservoir taking up space. The first solution is inapplicable on most automobiles, the actual gear casings being already at the limit of height above the ground.

This result is obtained according to the invention by a simple sump arranged at the lower part of the clutch block, between the latter and the gear case. This sump is provided with an incurved "scraper" fitting to within 1 or 2 mm. the shape of the outline of the clutch block. The effect of the scraper is to deliver the oil entrained by the clutch block to the exterior of the sump, that is to say, into the gear case itself.

The invention may be applied to transmissions comprising any number of speeds either with the driven shaft in the prolongation of the engine shaft, or with the driven shaft arranged in a different plane. For a three-speed transmission only, the construction may be considerably simplified owing to the fact that the second speed is connected directly and only on one of the two clutch plates which rotates idly in the first and third speed. It will be noted that, in this case, the corresponding pinions operate under the same conditions as on cars with "synchromesh" change-speed gears.

Other features of the invention will appear from the following description given in explanation of the annexed drawings which show by way of example, a practical embodiment.

In these drawings:

Figure 8 is a section on the line R—S—T of Figure 6;

Figure 9 is a section on the line U—V of Figure 6;

Figure 10 is a section of the hydraulic body, the moving members being removed;

Figure 11 is a section on the line O—Z—S—V of Figure 6;

Figure 1:
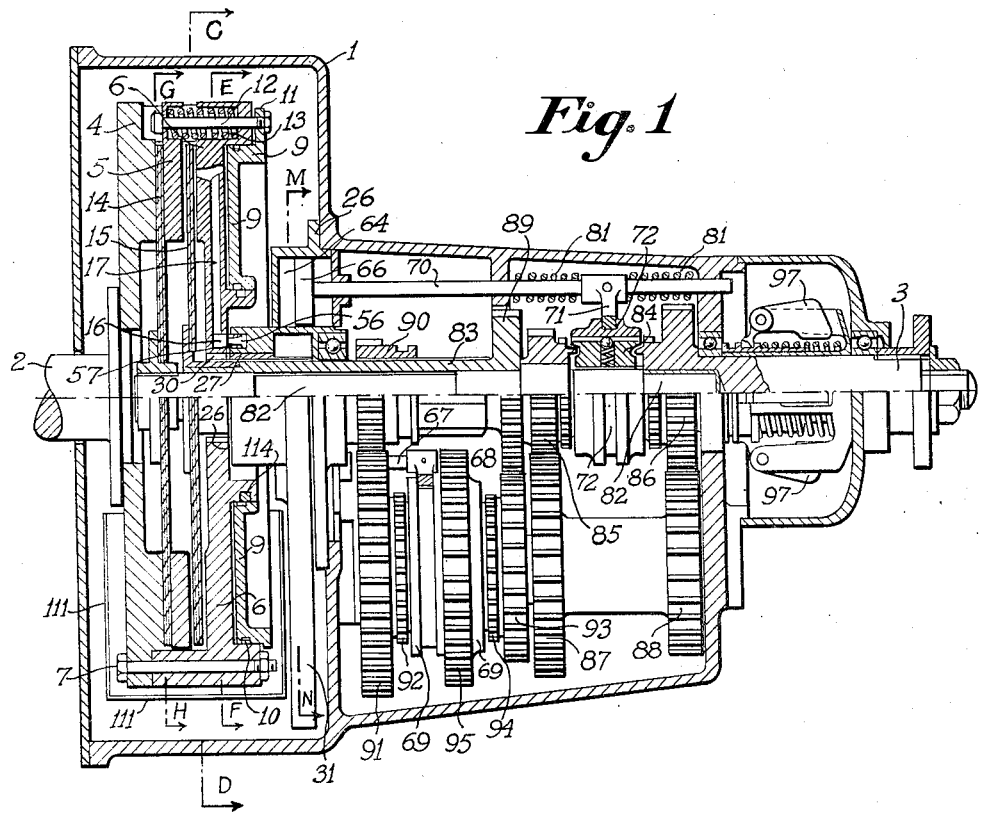
Figure 1 is a longitudinal section of the whole transmission, the section being on the line A—O—B of Figure 2.

Figures 15, 16, 17, 18 and 19 show diagrammatically the respective positions of the slide valve and of the double selector. In these figures, the numerals 1, 2, 3 and 4 correspond to the speeds obtained.

Figure 20 is a diagram of a three-speed gear box;

Figure 21 is a diagram of a five-speed gear box.

The gear case of ordinary construction is indicated by 1. 2 is the engine shaft and 3 the driven shaft. On the engine shaft 2 is fixed the group of the two clutches which comprises a flywheel 4, a plate 5 movable axially, a distributor plate 6 fixed to the flywheel 4 by a series of bolts 7. The movable plate 5 has at its periphery a series of teeth 8 (Figure 3) which engage freely in corresponding recesses of the rim of the distributor plate 6.

On its face opposite to the engine the distributor plate receives an annular piston 9, made tight on its large diameter by piston rings 10. On its small diameter an elastic piston ring of suitable shape 116 ensures a tight joint and the locking of the piston at the neutral position. On its large diameter this piston is provided with lugs 11 through which pass bolts or rods 12 connecting the annular piston to the movable plate 5. A series of springs 13 operating in compression tend to separate the movable plate 5 from the plate 6 fixed to the flywheel by bolts 7. Two clutch plates 14 and 15 are arranged on the one hand between the movable plate 5 and the flywheel 4 and, on the other hand, between the second plate of the movable plate 5 and the distributor plate 6.

Figure 3:
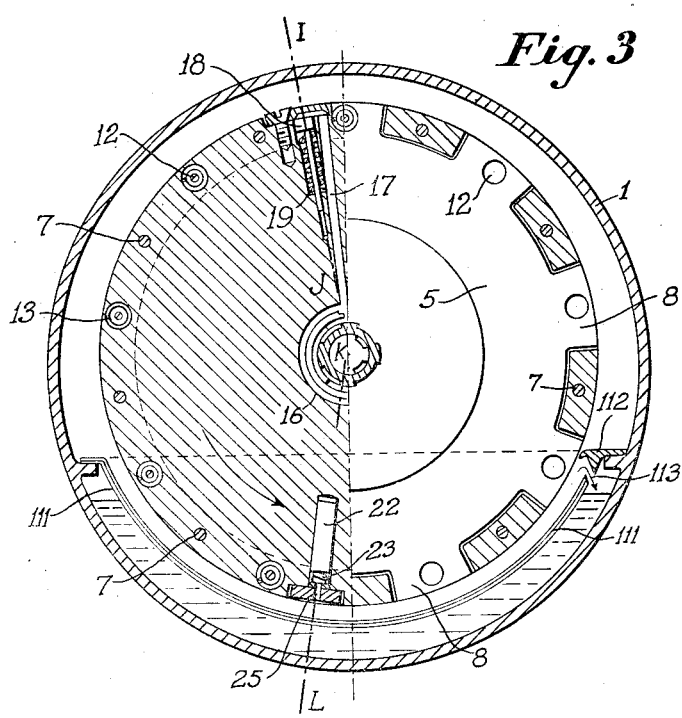
Figure 3 shows two half sections on the lines E—F and G—H of Figure 1, the clutch plates being removed.
Figure 4:
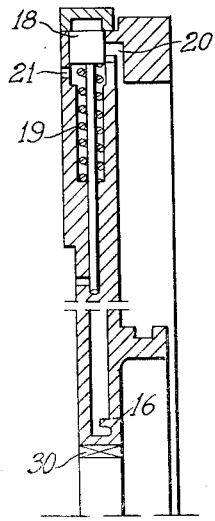
Figure 4 is a section on the line I—J—K of Figure 3.
Figure 5:
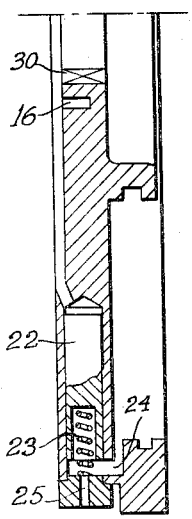
Figure 5 is a section on the line K—L of Figure 3.

The latter has, close to its hub, an annular channel 16 (Figures 1, 3, 5 and 9) communicating with a conduit 17 bored in the plate 6. This conduit 17 terminates at the periphery of the plate 6 above the speed valve 18, provided with a calibrated spring 19 (Figures 3 and 4). This type of valve counterbalanced with respect to centrifugal force is described in United States Patent Number 2,163,202, granted June 20, 1939. It ensures the control of the annular piston 9 through the conduit 20 (Figure 4), and the evacuation of the oil through the orifice 21.

Diametrically opposite this valve and on the same plate 6, is arranged a cylindrical plug 22 (Figures 3 and 5) adapted to slide freely in its recess. This plug is pressed towards the centre by a calibrated spring 23. The small chamber formed at the top of the plug when the latter is nearest the centre (position of Figures 3 and 5) communicates on the one hand with the cylinder of the annular piston 9, through the conduit 24, and on the other hand with the exterior, through the orifice 25.

Figure 6:
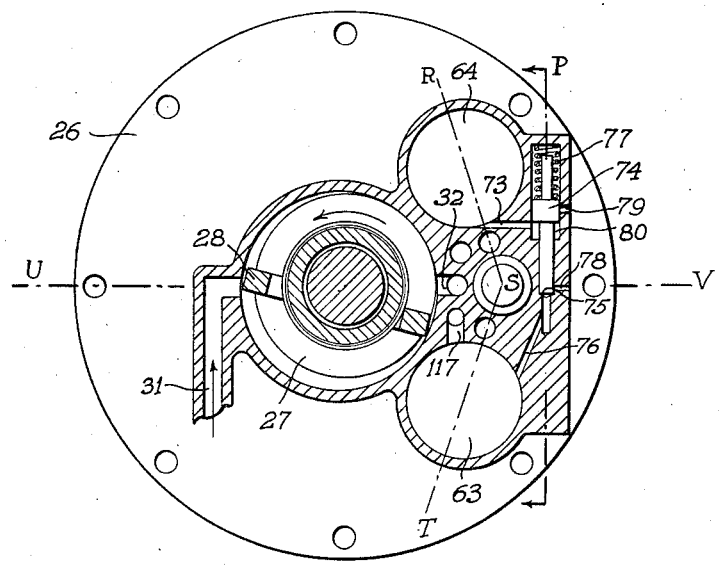
Figure 6 is a section on a larger scale on the line M—N of Figures 1 and 8.

The hydraulic body 26 is fixed to the casing 1. It may be made in a single piece with this casing without thereby changing in any way the character of the invention. The hydraulic body 26 centralises all the hydraulic operations of the system. It contains the pump 27 (Figures 6 and 9), here provided with blades 28, which is driven by the tubular shaft 29 and the dog clutches 30 (Figures 1, 4, 5 and 9) provided in the interior of the hub of the clutch plate 6 rotating with the flywheel 4.

The admission of oil to the pump 27 takes place through a tube 31 which descends into the lower portion of the casing 1. The pump delivers the oil through the conduit 32 (Figures 6 and 9) to the interior of the double selector 33 (Figures 8, 9 and 11). The latter is composed of a sliding sleeve 34 and a hollow cylinder 35 closed at its two extremities.

The sliding sleeve 34 is controlled by hand from the driver's seat through the usual system of rods acting on the double lever 36. The outer extremity of the sleeve 34 has a series of locking channels 37 each of which corresponds to a speed; a supplementary channel corresponds to the "stop" position. A bolt 38 serves to fix the sleeve 34 at the speed selected by the driver. Towards its centre the sleeve 34 has a perforated channel 39 of such length that in all its positions it permits the oil coming from the conduit 32 to reach the centre of the selector. On the side opposite to the locking channels, the sleeve 34 is provided with other perforated channels 40 which are calibrated and each of which corresponds to a speed. The last channel opens into a chamber 41 the function of which will be described later.

The hollow cylinder 35, closed at its two extremities, is controlled directly by the centrifugal governor (Figure 14) through the rod 141. The latter has over some portion of its length, a series of locking channels 42 (Figure 14) also corresponding to the number of the speeds. A bolt 43 creates a more or less strong resistance to the longitudinal displacement of the hollow cylinder 35. To this end, the tension of the spring 44 of the bolt may be modified by the driver preferably through the accelerator pedal which is connected by means of a usual rod system to the elbow lever 45. The hollow cylinder 35 admits the oil at its centre through a bored longitudinal channel 46 similar to the channel 39 of the sleeve 34. The oil can only escape from the hollow cylinder 35 through openings into a single exterior calibrated channel 47 (Figure 8) which places the interior of the hollow cylinder 35, through perforated channels 40 of the sleeve 34 in communication with the passages 48 made in the hydraulic body 26 also calibrated and distributing the oil as will be seen below.

For the better understanding of the operation, these passages 48, shown at the position which they actually occupy on Figure 8 are represented on the same plane in the diagrammatic Figures 15, 16, 17, 18 and 19, where they are indicated by 1, 2, 3, 4.

Figures 12, 13:
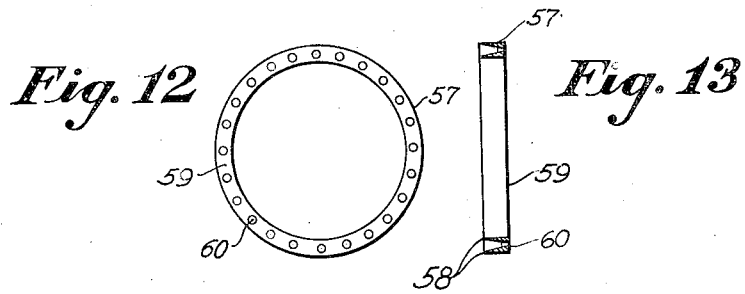
Figures 12 and 13 show in elevation and in section the distributor of fluid to the clutches.

The passages 48 (Figure 8) each open into a small separate chamber, 49 for the first speed, 50 for the second speed, 51 for the third speed, and 52 for the fourth speed. A channel 53 provided in the interior of the body 33 of the selector leads the oil to the "stop" position between two calibrated valves 54 and 55 (Figure 11); one of these, 54, the spring of which is weaker, leads to the chamber 56 (Figure 9) of the distributor 57 (Figure 13); the other, 55, is compressed by a spring the calibrated tension of which corresponds to half the working pressure of the oil. The distributor 57 is constituted by a hollow ring with thin walls 58 (Figures 12 and 13). Its single rigid face 59 is bored with holes 60 which permit of placing the chamber 56 in communication with the channel 16 which supplies the conduit 17 of the clutch plate 6. The delivery conduit 32 of the pump (Figure 9) is provided with a discharge valve 61 with spring 62 limiting the pressure of oil to the desired rate of working.

There appertain furthermore to the hydraulic body 26, two oil-tight cylinders 63 and 64 (Figures 6 and 8) in each of which a piston 65 and 66 can move. The rod 67 of the piston 65 has a fork 68 which controls the dog clutch sleeve 69 mounted on the secondary shaft of the change speed gear (Figure 1). The rod 70 of the piston 66 has the fork 71 which controls the dog clutch sleeve 72 mounted on the principal shaft of the change speed gear box.

Figure 7:
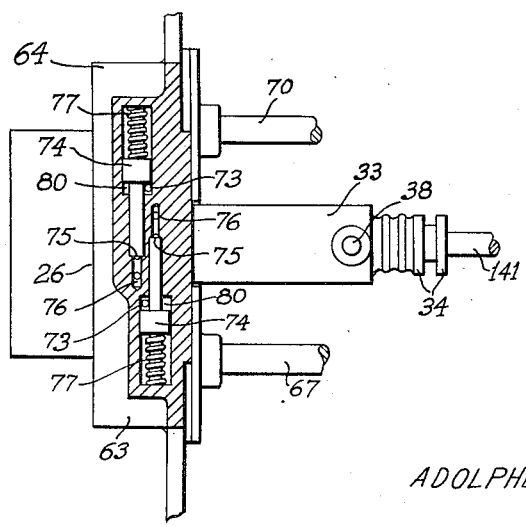
Figure 7 is a section on the line P—Q of Figure 6.

Each of the cylinders 63 and 64 communicates through a small conduit 73 opening into the centre of each cylinder with a push piece 74 (Figures 6 and 7) carrying a needle 75 which closes another small conduit 76 opening at the centre of the adjacent cylinder. A spring 77 calibrated to the maximum pressure of the oil bears against the push piece 74 and the needle 75. An orifice 78 places each of the needles 75 in communication with the exterior. Another orifice 79 also places the chamber 80 of each push piece 74 in communication with the exterior as soon as the push piece moves.

Springs 81 (Figures 1 and 8) arranged on each side of the forks 68 and 71 tend to bring the pistons 65, 66 and their forks 68 and 71 to the neutral point (position of the figure).

The change speed gear itself comprises the trains of gears in constant mesh and their system of dog clutches.

The reverse drive alone is obtained, as in the usual change-speed gears, by the displacement of a pinion.

The clutch disc 14 is provided with grooves and slides axially on splines on a central shaft 82 (Figure 1) which controls the second and fourth speeds. The disc 15 is mounted in the same way on the tubular shaft 83 controlling the first and third speeds.

The extremity of the shaft 82 opposite to the disc 14 engages freely in the driven shaft 3. Near the latter the shaft 82 has a splined portion on which slides the hub 84 of the clutch dog sleeve 72. The latter can be placed in engagement, by means of the piston 66, its rod 70, and its fork 71, either with the pinion 85 mounted freely on the shaft 82, or with the toothed wheel 86 integral with the driven shaft 3. The pinion 85 engages with the wheel 87 integral with the gear 88, both being integral with the secondary shaft. The toothed wheel 88 is in constant mesh with the gear 86 on the driven shaft.

The tubular shaft 83 terminates at the side opposite to the disc 15 by a gear-wheel 89 integral with the shaft. A pinion 90 mounted on a splined portion of the tubular shaft 83 can be moved axially on this latter by hand control in the ordinary way. This pinion 90 engages in forward running with the wheel 91 freely mounted on the secondary shaft. This wheel carries dog clutch teeth 92. The gear-wheel 89 is in constant mesh with the opposite gear-wheel 93 mounted also freely on the secondary shaft; the latter gear-wheel also has dog clutch teeth 94. Between the toothed wheels 91 and 93 there is provided a dog clutch block 69 which, sliding on a splined portion of the secondary shaft, can be placed in engagement through the piston 65, its rod 67 and the fork 68 either with the dog clutch 92 of the gear 91 or with the dog clutch 94 of the gear 93.

Figure 2:
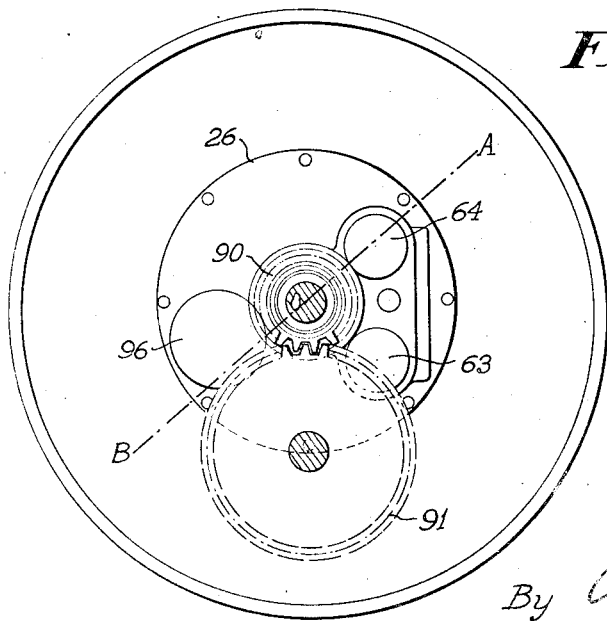
Figure 2 is a cross-section on the line C—D of Figure 1, the clutches being removed.

The dog clutch block 69 differs from the other one by having external teeth 95 which mesh with a pinion 96 represented diagrammatically on Figure 2, in order to obtain in a known manner a reverse drive by means of the hand controlled sliding pinion 90.

Figure 14:
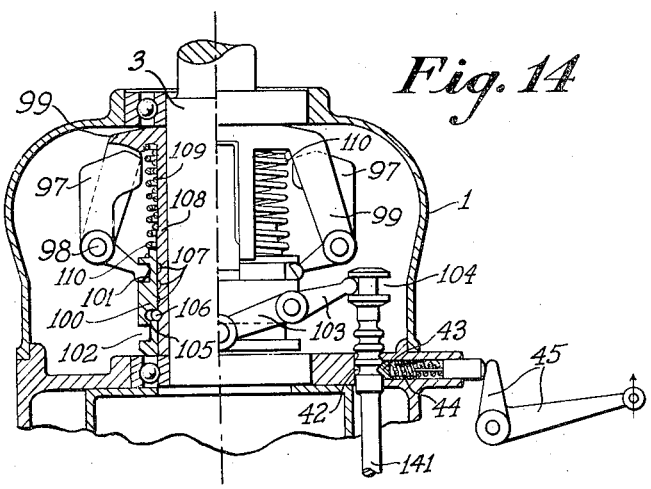
Figure 14 shows on a larger scale, the regulator and its control.
Figure 15:
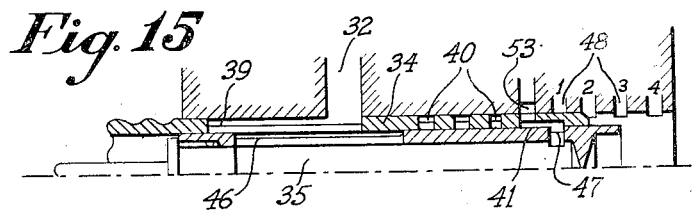

A centrifugal governor represented on a larger scale on Figure 14 is driven by the shaft 3. It is arranged at the exit of the change-speed gear, between the two roller bearings supporting the shaft 3 and does not therefore require any special support. It comprises masses 97 hinged at 98 on arms 99 forming the rotating body of the governor. A sliding sleeve 100 has on the outside two channels, one of which, 101, is acted upon by the masses 97 and the other, 102, transmits this action to the hinged lever 103 which, through its extremity opposite to the governor, acts through the groove 104 on the rod 141 integral with the hollow cylinder 35 of the selector.

The sliding sleeve 100 has on the inside a groove 105 in which a spring ring 106 (Figure 11) can move. This ring can engage consecutively in a series of grooves 107 of increasing depth, starting from that corresponding to the stop position and the number of which is the same as that of the speeds. These grooves 107 are provided on the hub 108 of the governor. The distance of the grooves from each other corresponds exactly to that of the grooves 42 of the rod 141 and this distance apart is also that of the apertures 48 and 40 of the selector 33 (Figure 15), and of its sleeve 34, the grooves 37 of which are also at the same distance apart. Springs 109 and 110 (Figure 14) of unequal strength and length oppose the displacement of the sleeve 100.

Between the gear block and the lower part of the casing 1 there is provided a pan 111 (Figures 1 and 3) fixed to the casing. This pan has a scraper 112 at a distance of 1 or 2 mm. from the periphery of the gear block and the section of which is similar to the fixed blade of a turbine. An aperture 113 is provided in the wall of the pan just below the scraper 112, to place the interior of the pan in communication with the casing.

The apparatus described operates as follows:

The car being stopped and the dog clutches not in engagement, the engine running slowly drives the pump 27 which through the conduit 32 delivers oil to the interior of the selector 33. The hollow cylinder 35 is then in its position of rest as shown on Figures 8, 9 and 15, and will remain there until the governor forces it to move away. The sliding sleeve 34 controlled by the driver, is also in the stop position, that is to say, it is in the position shown by Figures 8, 9 and 15. The oil leaves through the bored channel 47 of the hollow cylinder 35 (Figure 15), spreads out in the chamber 41 of the sliding sleeve and, from there, through the channel 53 comes between the valves 54 and 55 (Figure 11). The valve 54 having the weakest spring will open first, permitting the oil to pass through the distributor 57—60 (Figures 1, 9, 12 and 13) into the conduit 17 of the plate 6 and above the valve 18 (Figures 3 and 4) which it will open to penetrate, through the conduit 20, behind the annular piston 9 (Figure 1). The engine turning slowly, the centrifugal piece 22, thrust by its spring 23 will remain close to the centre. The oil which has penetrated behind the annular piston 9 can thus escape to the outside through the conduit 24 (Figure 5) and the orifice 25; it then passes without pressure and without effect into the cylinder of the piston 9, but, which is an important point, it will be ready to act almost instantaneously, since all the conduit and "dead" spaces will be filled by its continuous flow.

If, without changing the position of the sliding sleeve 34, the driver accelerates the engine, it follows that the head piece 22 will be applied on to its seat and in this way will close the conduits 24 and 25. The oil enclosed behind the annular piston 9 will increase in pressure. It will finally displace the piston 9 which, by means of the rods 12 (Figure 1), will shift the movable plate 5, compressing the springs 13. This axial displacement of the piston 9 will be somewhat weak and at first limited by the elastic ring 114 of the annular piston 9. Actually, this piston ring will engage elastically in the corresponding groove provided on the piston 9, thus presenting certain resistance to the forward movement thereof and it will remain in a neutral position. The oil having no outlet, the pressure will rise and attain a value sufficient (in practice about half the total pressure) to act on the valve 55 and pass to atmosphere through the orifice 115 corresponding thereto (Figure 11). The two clutch discs 14 and 15 are thus freed.

Figure 16:
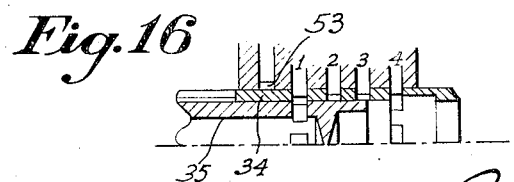

If now the sliding sleeve 34 is shifted to bring it to its extreme position shown on Figure 16, it is seen that the oil will pass through one of the perforated grooves 40 of the sleeve 34 to penetrate through one of the passages—that of first speed—into the small chamber 49 (Figures 8 and 10) to then act, through the passage 116 on the piston 65 controlling the dog clutch sleeve 69. The piston will thus place the latter in engagement with the dog clutch teeth 92 (Figure 1) of the toothed wheel 91. During its stroke the piston 65 will uncover the conduit 117 (Figures 6, 8 and 10) which will take the oil to the distributor 57—60 and, from there, as previously, to the admission valve 20 (Figures 3 and 4) and then behind the annular piston 9. The engine running at a speed higher than its idle running rate, the head piece 22 has closed the oil outlet, so that no escape being provided, the pressure will act with its maximum intensity behind the annular piston 9, overcoming the resistance of the elastic piston ring 114, and carrying the sliding plate 5 along until the latter sufficiently compresses the clutch disc 15, to obtain the transmission of the drive. The disc 14 remains completely free. The first speed will then be obtained, passing through the gears 90—91, the dog clutch sleeve 69, the toothed wheel 88, keyed on the secondary shaft, and the pinion 86 integral with the driven shaft. It will be noted that the pinion 85 which engages with the toothed wheel 87 integral with the secondary shaft, will rotate idly on the first shaft. It will be the same with the toothed wheel 93 mounted idly on the secondary shaft, and which will be driven by the pinion 89 integral with the shaft 83.

The vehicle then moves forward in first speed. As soon as it has attained the intended speed, the regulator will act, displacing the sleeve 100 (Figure 14), which will be immobilised in the first of the grooves 107 by means of its elastic ring 106. To the resistance of this first groove there will be added that produced by the locking 43—44 (Figure 14) of the first of the grooves 42 of the rod 141 which controls the hollow cylinder 35 of the selector. The distance between the groove and the apertures of the selector being the same, the bored groove 47 of the hollow cylinder 35 will come opposite the passage 2 (Figure 17) of the body 33 of the selector. It will be noted that whatever may be the position of the sliding sleeve 34 it will be sufficient for one of its grooves 40 to be opposite the passage 2 to ensure the flow of the oil which thus passes into the small chamber 50 (Figure 8) and, from there, through the passage 118, up to the piston 66 of the cylinder 64.

The piston 66 will thus move, carrying along the dog clutch sleeve 72 which, the shaft 82 being free, will engage without trouble the gear 85. The disc 14 will thus be rotated idly through the intermediation of the toothed wheels 90—91 and 87—85, in the same direction as the engine, but at a lower speed. As soon as the piston 66 has reached the end of its stroke, which will be rapid in consequence of the small volume to be filled, the pressure in the cylinder 64 will reach its maximum. The oil will then displace the push piece or driver 74 (Figures 6 and 7) which, through its needle, will uncover the orifices 76 and 78, thus placing the cylinder 63 in communication with the exterior and at the same time, all the conduits leading to the valve 18 (Figures 3 and 4), the latter under the effect of the reduction of pressure, and acted upon by its spring 19, will close, uncovering the outlet orifice 21.

Aided by centrifugal force, the oil will be rapidly evacuated and the annular piston 9 acted upon energetically by the springs 13, will take up its original position again after having carried with it the movable plate 5 which will compress the clutch disc 14, liberating the disc 15. The disc 14 mounted on the central shaft 82 carrying the dog clutch sleeve 84—72, in engagement with the pinion 85, will drive the wheel 87 integral with the toothed wheel 88, in engagement with the pinion 86 of the driven shaft. The second speed is thus in engagement. The piston 65 which no longer receives pressure and evacuates its oil by the movement of the needle 75 and under the influence of one of the springs 81 (Figure 1) will take up its neutral position in which it will be kept by the locking device of the dog clutch sleeve 69.

The speed of the vehicle continuing to increase, the regulator, by the same process as formerly, will bring the groove 47 of the hollow cylinder 35 opposite the passage 3 corresponding to the orifice 48 of the small chamber 51 of Figure 8. The oil under pressure will pass from there behind the piston 65 and will move it, which will place the dog clutch sleeve 69 in engagement with the dog clutches 94 of the toothed wheel 93 which is in continuous engagement itself with the pinion 89 integral with the clutch disc 15 freed at this moment. The oil, in the same way as for the first speed, that is to say, through the conduit 117 (Figures 6, 8 and 10) will reach the distributor 57—60, then the valve 18 and arrive finally behind the annular piston 9. It will move the latter to free the clutch disc 14 and to compress the disc 15, driving the toothed wheel 89. There is thus obtained the third speed.

When the pressure has attained its maximum, that is to say, when the disc 15 is freely driven, the push piece or driver 74 of the cylinder 63 will uncover, by its needle 75, the discharge orifices 76 and 78 (Figures 6 and 7) of the cylinder 64, thus evacuating the oil which it contains. The orifice 79 is intended to create a slight leakage of oil, permitting the closing of the needle 75 of the cylinder 63 as soon as the admission of oil is interrupted in the cylinder 64. The piston 66 will then again take up its neutral position under the action of one of the corresponding springs 81.

When the vehicle has attained a speed enabling the regulator to bring the spring ring 106 into the last of the grooves 107 (Figure 14), the groove 47 of the hollow cylinder 35 will come opposite the passage 4 (Figure 18) which corresponds to the conduit 48 of the small chamber 52, which is in communication with the rear of the piston 66 of the cylinder 64. The delivery of oil into the cylinder 63 having been cut off, the driver 74 and the corresponding needle 75 have again closed. The pressure can thus increase in the cylinder 64, the piston of which will place the dog clutch sleeve 72—84 in engagement with the driven shaft 3 (Figure 1). When the pressure has attained its maximum in the cylinder 64, the driver 74 will displace the needle 75 which will place in communication the orifices 76 and 78 of the cylinder 63, still full of oil. The latter, finding an outlet through the orifices 76 and 78, will escape and, the pressure falling, the valve 18 for the supply of oil to the gears will again close, at the same time evacuating the oil contained behind the annular piston 9. The latter energetically acted upon by the springs 13 (Figure 1) will follow the movable plate 5 which, liberating the disc 15 owing to this, will grip the disc 14, integral with the shaft 82, in direct engagement with the driven shaft 3, through the intermediation of the dog clutch sleeve 72—84. The apparatus is therefore in fourth speed.

The piston 65 of the cylinder 63 will take up again its neutral position as already described.

As will be seen, the transmission will pass successively and automatically through the four speeds by the operation of the regulator alone, nevertheless on condition that the driver has placed the sliding sleeve 34 in its position of full speed, as represented on the diagrammatic figures 16 and 18.

Conversely, when the speed of the vehicle diminishes, the regulator sleeve 100 will move in the reverse direction under the action of its springs and will bring the groove 57 of the hollow cylinder 35 consecutively opposite the passages 3, 2, 1; the operations then take place exactly in the order described for increasing the speed, as regards each of the descending speeds consecutively engaged.

If the driver keeps the sliding sleeve in the second speed position, as on the diagrammatic Figures 18 and 19, it will be seen that the groove 47 of the hollow cylinder 35 cannot supply the "stop," "first speed" and "second speed" orifices. If, in this position, the driver accelerates excessively, the regulator will take up the position of the third speed (Figure 19) bringing the groove 47 to the extremity of the inner chamber 41 of the sleeve 34, without however the supply of the third speed being able to take place. The chamber 41 will thus continue indefinitely the supply to the second speed as long as the slowing up of the vehicle does not cause the regulator to act to bring the hollow cylinder 35 to a lower speed position.

It is thus seen that the driver can keep the vehicle at the speed he desires by the simple displacement of the sliding sleeve 34. It is evident that the reasoning carried out above as regards the second speed, is also valid for the first or the third speeds.

It will be noted, furthermore, that when the device is controlling any speed whatever, the simple replacement of the sliding sleeve 34 to the "stop" position causes the instantaneous evacuation of the oil, the passages 2, 3, 4 being placed directly in communication with atmosphere (Figures 8, 9 and 15) except always that of the first speed. The instantaneous disengagement of the engine then follows since at the "stop" position the pressure of the oil is restricted to one-half of its maximum value owing to the action of the valve 55.

Figures 20 and 21 show diagrammatically the arrangements to be adopted to construct, according to the invention, three and five speed transmissions.

For the three-speed transmission (Figure 20), a single dog clutch control cylinder is sufficient; it controls the first and third speeds. The second remains alone on the second gear which, disengaged, rotates idly in the case of first and third speeds. This considerably simplifies the construction and consequently permits of notably reducing the cost price.

For five-speed transmission (Figure 21), three dog clutch control cylinders are necessary, two for double dog clutching and one with single dog clutching.

It is possible to construct on the same principle, a six or more speeds transmission, the even speeds being always controlled by one of the clutches, and the odd speeds by the other.

I claim:

1. An automatic transmission for automotive vehicles comprising an engine shaft, a change speed device having two drive shafts, a friction clutch device for selectively coupling one of the drive shafts to the engine shaft, a driven shaft, a plurality of constant mesh gear wheels in said change speed device, dog clutches for transmitting power through said shafts and gear wheels, hydraulic means for selectively actuating the dog clutches resilient means for actuating the clutch to couple one of said drive shafts to the engine shaft, hydraulic means for actuating the friction clutch device counteracting said resilient means, to couple the other of said drive shafts to the engine shaft, both of said hydraulic means being actuated by fluid under pressure which passes from the former hydraulic means to the latter hydraulic means, so that the operation of the hydraulic friction clutch actuating means is delayed until after operation of the hydraulic dog clutch actuating means.

2. An automatic transmission for automotive vehicles comprising an engine shaft, a change speed device having two drive shafts, a friction clutch device for selectively coupling one of the drive shafts to the engine shaft, spring actuated means for urging the clutch into position to couple one drive shaft to the engine shaft, hydraulically actuated means for overcoming the effect of the spring actuated means to decouple the engine shaft from aforesaid drive shaft and to couple it to the other drive shaft, a driven shaft, constant mesh gear wheels in said change speed device, dog clutches for transmitting power through said shafts and gear wheels, hydraulic means for selectively actuating the dog clutches said hydraulically actuated means being operated by fluid under pressure which has passed from said hydraulic means for selectively actuating the dog clutches, so that the operation of the friction clutch is delayed until after operation of the dog clutch for a given speed change.

3. An automatic transmission for automotive vehicles comprising an engine shaft, a change speed device having two drive shafts, a double acting friction clutch having a shiftable element for selectively coupling the engine shaft to one of the two drive shafts, a piston connected to the shiftable element, a cylinder for said piston, a spring urging said piston to a position to couple the engine shaft to one of the drive shafts, means for supplying fluid under pressure to the cylinder to displace the piston to a position to couple the engine shaft to the other drive shaft, said cylinder having a ring receiving groove, an expansible ring therein, said piston having a groove to receive said ring when the grooves in the piston and cylinder register to resiliently retain the piston in intermediate clutch disengaged position, a driven shaft, constant mesh gear wheels in said change speed device, dog clutches for transmitting power through said shafts and gear wheels, hydraulic means for selectively actuating the dog clutches, and means for delaying operation of the friction clutch until after operation of the dog clutch for a given speed change.

4. An automatic transmission comprising an engine shaft, a change speed device having two drive shafts, a double acting friction clutch having a shiftable element, spring means urging the shiftable element to a position to couple the engine shaft with one of the drive shafts, hydraulically actuated means for shifting the shiftable element against the action of the spring to a position to couple the engine shaft to the other drive shaft, a driven shaft, constant mesh gear wheels, shafts and dog clutches for selectively transmitting power from the drive shafts to the driven shafts, hydraulic means for actuating the dog clutches said hydraulically actuated means being operated by fluid under pressure which has passed from said hydraulic means for selectively actuating the dog clutches, so that the friction clutch is operated to couple a given drive shaft to the engine shaft after the dog clutch in the drive connection between the given drive shaft and the driven shaft has been actuated.

5. An automatic transmission comprising an engine shaft, a change speed device having two drive shafts, a double acting friction clutch having a shiftable element, spring means urging the shiftable element to a position to couple the engine shaft with one of the drive shafts, hydraulically actuated means for shifting the shiftable element against the action of the spring to a position to couple the engine shaft to the other drive shaft, a driven shaft, constant mesh gear wheels, shafts and dog clutches for selectively transmitting power from the drive shafts to the driven shafts, hydraulic means for actuating the dog clutches, and delayed action means for actuating the friction clutch to couple a given drive shaft to the engine shaft after the dog clutch in the drive connection between the given drive shaft and the driven shaft has been actuated, a member rotatable with the engine shaft, a valve carried by said rotatable member, a spring maintaining said valve in open position to release liquid from the hydraulically actuated friction clutch element shifting means, said valve being centrifugally closed upon increase of rotary speed of said rotatable member to actuate the shiftable element shifting means.

6. An automatic transmission comprising an engine shaft, a change speed device having two drive shafts, a double acting friction clutch having a shiftable element, spring means urging the shiftable element to a position to couple the engine shaft with one of the drive shafts, hydraulically actuated means for shifting the shiftable element against the action of the spring to a position to couple the engine shaft to the other drive shaft, a driven shaft, constant mesh gear wheels, shafts and dog clutches for selectively transmitting power from the drive shafts to the driven shaft, hydraulic means for actuating the dog clutches, delayed action means for actuating the friction clutch to couple a given drive shaft to the engine shaft after the dog clutch in the drive connection between the given drive shaft and the driven shaft has been actuated, means for controlling the supply of liquid to the dog clutch actuating means comprising a ported cylinder, a ported sleeve having ports adapted to register with those in the cylinder, a hollow piston having a port adapted to register with the ports in the sleeve, speed responsive means for controlling the position of the hollow piston to progressively bring the port in the piston into register with the ports in the cylinder, and manual means for controlling the position of the sleeve to limit the number of cylinder ports with which the piston port may register.

7. An automatic transmission comprising an engine shaft, a change speed device having two drive shafts, a double acting friction clutch, having a shiftable element, spring means urging the shiftable element to a position to couple the engine shaft with one of the drive shafts, hydraulically actuated means for shifting the shiftable element against the action of the spring to a position to couple the engine shaft to the other drive shaft, a driven shaft, constant mesh gear wheels, shafts and dog clutches for selectively transmitting power from the drive shafts to the driven shafts, hydraulic means for actuating the dog clutches, and delayed action means for actuating the friction clutch to couple a given drive shaft to the engine shaft after the dog clutch in the drive connection between the given drive shaft and the driven shaft has been actuated, the hydraulic means for actuating the dog clutches comprising cylinders and double acting pistons, rods connected to the pistons and forks carried by the rods for shifting the dog clutches.

8. An automatic transmission comprising an engine shaft, a change speed device having two drive shafts, a double acting friction clutch having a shiftable element, spring means urging the shiftable element to a position to couple the engine shaft with one of the drive shafts, hydraulically actuated means for shifting the shiftable element against the action of the spring to a position to couple the engine shaft to the other drive shaft, a driven shaft, constant mesh gear wheels, shafts and dog clutches for selectively transmitting power from the drive shafts to the driven shafts, hydraulic means for actuating the dog clutches, delayed action means for actuating the friction clutch to couple a given drive shaft to the engine shaft after the dog clutch in the drive connection between the given drive shaft and the driven shaft has been actuated, the hydraulic means for actuating the dog clutches comprising cylinders and double acting pistons, rods connected to the pistons and forks carried by the rods for shifting the dog clutches, and springs associated with the dog clutch fork rods for urging the dog clutches to a neutral disengaged position.

9. A power transmission comprising a driving shaft, a driven shaft, a change speed mechanism having drive shafts and constant mesh gear wheels, means for selectively coupling the said drive shafts of the mechanism to the driven shaft through said gear wheels, a friction clutch device for alternatively coupling the driving shaft to the shafts of the change speed mechanism respectively, fluid pressure reciprocating means for actuating the said coupling means, and the friction clutch device, a pump actuated by the driving shaft, conduits connecting said pump with the reciprocating means, and valves in said conduits, operated by the driving shaft and the driven shaft, to control the flow of fluid to the reciprocating means.

10. A power transmission comprising a driving shaft, a driven shaft, a change speed mechanism having drive shafts and, constant mesh gear wheels, means for selectively coupling the said drive shafts to the driven shaft through said gear wheels, a friction clutch device for alternatively clutching the driving shaft to the drive shafts respectively, hydraulic means for operating the friction clutch device, hydraulic means for operating the said coupling means, and means for controlling the supply of liquid to the latter hydraulic means comprising a ported cylinder, a ported sleeve having ports adapted to register with those in the cylinder, a hollow piston having a port adapted to register with the ports in the sleeve, means responsive to the speed of the driven shaft for controlling the position of the hollow piston to progressively bring the port in the piston into register with the ports in the cylinder, and manually operable means for controlling the position of the sleeve to limit the number of cylinder ports with which the piston port may register.

ADOLPHE KÉGRESSE.